Patented May 15, 1951

2,553,485

UNITED STATES PATENT OFFICE 2,553,485

DEXTRINIZATION OF MANNO-GALACTANS

John W. Swanson, Appleton, Wis., assignor to The Institute of Paper Chemistry, Appleton, Wis., a corporation of Wisconsin No Drawing. Application October 25, 1946, Serial No. 705,819

4 Claims. (Cl. 260—209)

The present invention relates to improved manno-galactan adhesive compositions and methods of producing the same, and in particular, to manno-galactan compositions of lowered viscosity adapted for use in the sizing or coating of cellulosic sheet products.

Manno-galactan mucilages, such as are used in the paper industry, are polysaccharide products obtained from the endospermic substances formed in various leguminous seeds. The seeds from which manno-galactan mucilages are most commonly obtained are guar seeds, *Cyamopsis tetragonoloba*; tara seed, *Ceasalpinia spinosa*; locust beans, *Ceratonia siliqua*; and flame tree seed, *Delonix regia*.

The manno-galactan mucilages referred to in the following specification and claims are of the commercial types which are obtained by either the wet or dry milling of the suitable seeds. Chemically they are principally composed of mannose and galactose linked in a polymeric form. The commercial products usually contain 6–15 percent water, 5–12 percent protein, and 1 percent ash in addition to the principal polysaccharide.

In the paper art finely divided manno-galactan mucilages may be introduced into the beater charge before the cellulosic web is formed, in order to increase the wet strength and the bursting strength of the finished cellulosic product. Under certain conditions it is desirable to apply a sizing material to a paper sheet, after forming, to increase the strength of the paper and as an adhesive for pigment coating. Heretofore, because of the high viscosity of manno-galactan mucilage adhesives, it has been impossible to apply them to cellulosic products after formation of the web by means of tub sizing or calendar sizing, or for use as an adhesive for pigment coating. Dispersions of manno-galactan mucilages are extremely viscous even in dilute proportions and if the dispersion is diluted so that it flows freely enough to be usable in the above sizing processes, the dispersion becomes so attenuated that there is insufficient active material to furnish the desired adhesive and sizing properties. The term dispersion as used in the present application applies to a true solution, a mechanical dispersion or suspension, or a combination of a true solution and a dispersion.

The object of the invention is to provide a manno-galactan polysaccharide mucilage or adhesive substance that is adapted to be applied in a sufficiently mobile aqueous dispersion of the required solids content so that it may be used as a sizing material or coating adhesive for paper or the like.

I have discovered that when powdered manno-galactan mucilage from the common commercial sources is heated in a substantially dry condition a change in its structure occurs. The heating may be carried on either in the presence of or in the absence of an acidic substance (apparently functioning as a catalyst); however, the presence of an acidic substance allows lower temperatures to be used and the resulting product is clear and light colored. The product of the degradation when subsequently dispersed in water forms a dispersion which exhibits a greatly lowered viscosity as compared to a dispersion containing the same concentration of untreated mucilage. The mucilage treated in the above manner has been found to possess all of the exceptionally valuable properties of the untreated mucilage, and in addition, the lowered viscosity enables it to be used for the sizing of paper and as an adhesive for the pigment coating of paper.

A satisfactory mucilaginous adhesive material for tub-sizing or pigment coating paper should be degraded to the extent that a one percent aqueous dispersion will show a viscosity, at 30° C., of not more than about 15 centipoises. However, a product having a greater viscosity may be used to advantage for the calender sizing of paper.

The following examples will serve to illustrate the preferred methods of preparation of the improved adhesive composition in accordance with my invention.

*Example I*

A batch of substantially dry, powdered, (50–200 mesh) manno-galactic substance made from guar seed is placed in a conventional rotating type dextrinizing kettle or drum. The material is heated to a temperature of 175° C. for one and three-quarters hours, after which the degraded product is removed and cooled. A dispersion made by dispersing one part by weight of the degraded manno-galactan mucilage in 100 parts by weight of hot water (85° C.) will upon cooling have a viscosity of 1.3 centipoises at 30° C. (as determined with an Ostwald-Fenske viscometer). A similar dispersion of the untreated manno-galactan mucilage will show a viscosity of 600–700 centipoises under the same test conditions.

The length of the heating period and the temperature of the reaction are interrelated. It has been determined that the amount of heating needed for effective degradation in the absence of an acidic substance, is equivalent to the use of a temperature of from 150–180° C. for a period, depending upon the temperature, of from one to two hours. The desired degree of degradation is obtained when a one percent aqueous dispersion, prepared as above, shows a viscosity, at 30° C., of not more than about 15 centipoises. It is desirable to carry on the degradation at the lowest temperature possible, consistent with the allowable time, in order that the degraded product is completely dispersible in hot water.

An acidic substance may be used in the degradation of manno-galactan mucilage to allow a reduction in the temperature at which degradation is effected with a resultant improvement in the physical appearance of the product. The presence of an acidic substance also insures a product which is completely dispersible in hot water.

*Example II*

A batch of 100 parts by weight of substantially dry, powdered guar seed, manno-galactan mucilage is placed in a standard type rotating dextrinizing drum at room temperature. While the mass is being vigorously agitated anhydrous hydrogen chloride gas is introduced until about 0.12 part by weight of acid has been absorbed. The product is thoroughly mixed and is allowed to temper for several hours to insure the even distribution of the acid. The temperature is then raised to 143° C. and held there for sixteen hours, whereupon the product is removed and cooled. The cooled, degraded manno-galactan mucilage product, when dispersed in hot water to form a one percent dispersion, as described in Example I, has a viscosity, at 30° C., of about 2.5 centipoises, as compared with a similar dispersion of untreated mucilage which has a viscosity of from 600–700 centipoises.

*Example III*

A batch of 100 parts by weight of substantially dry, powdered guar seed, manno-galactan mucilage is placed in a standard type rotating dextrinizing drum at room temperature. While the mass is being vigorously agitated anhydrous hydrogen chloride gas is introduce until about 0.266 part by weight of acid has been absorbed. The product is thoroughly mixed and allowed to temper for several hours to insure the even distribution of the acid. The temperature is then increased to 130° C. and held there for 0.5 hour, whereupon the product is removed and cooled. The cooled, degraded manno-galactan mucilage product, when dispersed in hot water to form a one percent dispersion as described in Example I, has a viscosity, at 30° C., of about 1.7 centipoises, as compared with a similar dispersion of untreated mucilage which has a viscosity of from 600–700 centipoises.

The process is not limited to the use of anhydrous hydrogen chloride as the acidic substance or the temperature disclosed in the above example. Other acids, both mineral and organic, such as nitric acid, phosphoric acid, acetic acid, propionic acid, etc. and acidic salts may be used. The acids in the form of an aqueous solution may be sprayed into the agitated powdered mucilage if the water content of the resulting mixture is carefully controlled. A wide range of temperatures may be used to accomplish the desired result. The temperature may range from 115–160° C., but the preferred temperatures, in the presence of an acidic substance, are about 120–140° C.

The procedures explained above are not limited to guar seed manno-galactan mucilages, but may also be used to degrade the mucilages obtained from tara seed, locust beans, and flame tree seeds and thus effect a reduction in the viscosity of aqueous dispersions made from the said mucilages.

In general the viscosity and appearance of the final product will depend upon the amount of acidic substance, the hydrogen ion activity of the catalyst, the temperature of degradation, the length of the heating period, and the amount and kind of impurities in the mucilage to be treated. When no acidic substance is used considerably higher temperatures are required to accomplish the desired degradation with the resulting lowered aqueous viscosity. At higher temperatures the product has a dark color which offers disadvantages for use on bright, high quality papers. The amount of acidic substance to be used depends to a considerable extent on the strength of the acid employed. The upper limit for weak acids such as acetic acid, is higher than for strong acids such as hydrochloric. However, the amount of acidic substance should not be so high as to permit further degradation of the partially degraded product upon cooling to room temperature. The preferred quantity of hydrogen chloride varies between 0.1 and 0.5 percent in accordance with the temperature of degradation. When using a low temperature (120° C.) for a prolonged period the hydrogen chloride is almost completely utilized, but at high temperatures (150° C.) a considerable part of the acid is volatilized or driven off. Objectionable excess acid in the finished product may be carefully neutralized with ammonia gas if desired.

The impurities in the mucilage influence the reaction by changing the acid concentration during degradation. It is desirable from this standpoint to use a mucilage that contains few impurities in the manno-galactan mixture. The impurities in the mucilage also tend to reduce the adhesive qualities in the finished product and thus a fairly pure mucilage is required to insure that the degraded mucilage has superior adhesive qualities.

The following examples of paper treated with degraded manno-galactan mucilage will illustrate the advantages realized from my invention.

As an example of the exceptional tub sizing qualities of the degraded manno-galactan mucilage, for paper and paper-board, paper sheets were treated with a sizing dispersion made from my improved product. The dispersion was made by slurrying 6 parts by weight of degraded mucilage with 100 parts by weight of cold water. Steam was injected directly into the slurry until the temperature reached 85° C. at which point an adequate dispersion was obtained. The dispersion was cooled and then diluted so that it contained 4 percent mucilage solids, a preferred concentration for tub sizing.

Upon application of the degraded manno-galactan sizing solution prepared as above to 100 percent rag stock at 55° C. by the conventional tub-sizing means, the bursting strength is increased 50 percent as compared to the same paper without sizing. A good commercial tub sizing starch when applied to the same paper in 5 percent concentration only shows a 28 percent increase in bursting strength. As an added improvement in the paper sheet, the degraded manno-galactan mucilage sizing greatly increases the folding endurance of the sheet over the endurance usually observed with standard commercial sizing materials.

A dispersion of degraded manno-galactan mucilage provides a superior adhesive for use in the pigment coating of paper. The adhesive dispersion is made by slurrying ten parts by weight of degraded manno-galactan mucilage in 100 parts by weight of cold water. The slurry is heated to 85° C. by the direct injection of steam into the slurry. At 85° C. the dispersion of the mucilage is effected. It is then mechanically stirred and allowed to cool to 35-40° C. The mucilage dispersion is added to a standard clay slip and the mixture is used for coating paper in the conventional manner. For this use the degraded manno-galactan mucilage shows an adhesive strength equivalent to the adhesive strength of high quality casein. Coatings made in the manner described above are water soluble but they may be made insoluble by spraying or otherwise treating the coated sheet with borax or other alkaline borate.

Various modifications and variations of my invention may suggest themselves to those skilled in the art. Hence, I do not wish to be limited to the specific embodiments disclosed herein, but intend that the scope of my invention be determined from the appended claims which are to be interpreted as broadly as the state of the art will permit.

I claim:

1. The method of producing an improved adhesive substance, particularly adapted to sizing cellulosic sheet products, which comprises heating a manno-galactan substance in a substantially dry condition to a temperature of from about 115 to 160° C. for a period of over about 0.5 hour, the heating of the material being effected in the presence of an acidic substance, and the heating being terminated when a one per cent aqueous dispersion of the heat treated manno-galactan substance, prepared by heating a slurry of the heat treated substance to about 85° C., has a viscosity, at 30° C., of less than about 15 centipoises.

2. The method of producing an improved adhesive substance, particularly adapted to sizing cellulosic sheet products, which comprises heating a manno-galactan substance in a substantially dry condition to a temperature from about 115 to 160° C. for a period of at least over about 0.5 hour, the heating of the material being effected in the presence of at least about 0.1 per cent of a mineral acid, and the heating being terminated when a one per cent aqueous dispersion of the heat treated manno-galactan substance, prepared by heating a slurry of the said heat treated substance to about 85° C., has a viscosity, at 30° C., of less than about 15 centipoises.

3. The method of claim 2 in which the mineral acid is hydrochloric acid.

4. The method of producing an improved adhesive substance, particularly adapted to sizing cellulosic sheet products, which comprises heating a comminuted manno-galactan substance in a substantially dry condition at a temperature from about 125 to 140° C. for a period of about 0.5 hour, the heating of the material being effected in the presence of from about 0.1 to 0.5 per cent of anhydrous hydrochloric acid.

JOHN W. SWANSON.

REFERENCES CITED

The following references are of record in the file of this patent:

UNITED STATES PATENTS

| Number | Name | Date |
|---|---|---|
| 566,497 | Castle | Aug. 25, 1896 |
| 2,016,617 | Schlubach | Oct. 8, 1935 |
| 2,073,616 | Acree | Mar. 16, 1937 |
| 2,444,412 | Swanson | July 6, 1948 |

FOREIGN PATENTS

| Number | Country | Date |
|---|---|---|
| 673 | Great Britain | Feb. 19, 1879 |

OTHER REFERENCES

Smith et al., Ind. Eng. Chem. v. 36 (1944) p. 1052-1054, 3 pages.